(12) United States Patent
Quint et al.

(10) Patent No.: US 11,595,438 B2
(45) Date of Patent: Feb. 28, 2023

(54) WEBPAGE PHISHING DETECTION USING DEEP REINFORCEMENT LEARNING

(71) Applicant: Microsoft Technology Licensing, LLC, Redmond, WA (US)

(72) Inventors: Eleanor Catherine Quint, Lincoln, NE (US); Jugal Parikh, Sammamish, WA (US); Mariusz Hieronim Jakubowski, Bellevue, WA (US); Nitin Kumar Goel, Bothell, WA (US); Douglas J Hines, Kenmore, WA (US); Cristian Craioveanu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 17/244,277

(22) Filed: Apr. 29, 2021

(65) Prior Publication Data
US 2022/0353292 A1 Nov. 3, 2022

(51) Int. Cl.
*H04L 9/40* (2022.01)
*G06N 3/08* (2006.01)
(Continued)

(52) U.S. Cl.
CPC ....... *H04L 63/1483* (2013.01); *G06N 3/0436* (2013.01); *G06N 3/084* (2013.01)

(58) Field of Classification Search
CPC ... H04L 63/1483; G06N 3/0436; G06N 3/084
(Continued)

(56) References Cited

U.S. PATENT DOCUMENTS

2009/0089859 A1* 4/2009 Cook .................. H04L 63/1441
726/3
2016/0344770 A1* 11/2016 Verma ..................... H04L 51/42
(Continued)

FOREIGN PATENT DOCUMENTS

CN 113098887 A * 7/2021
CN 113132410 A * 7/2021
(Continued)

OTHER PUBLICATIONS

Chatterjee et al., "Deep Reinforcement Learning for Detecting Malicious Websites", arXiv:1905.09027, 2019, pp. 1-8. (Year: 2019).*
(Continued)

*Primary Examiner* — Peter C Shaw
(74) *Attorney, Agent, or Firm* — Schwegman Lundberg & Woessner, P.A.

(57) ABSTRACT

Generally discussed herein are devices, systems, and methods for improving phishing webpage content detection. A method can include identifying first webpage content comprises phishing content, determining, using a reinforcement learning (RL) agent, at least one action, generating, based on the determined at least one action and the identified first webpage content, altered first webpage content, identifying that the altered first webpage content is benign, generating, based on the determined at least one action and second webpage content, altered second webpage content, and training, based on the altered second webpage content and a corresponding label of phishing, a phishing detector.

20 Claims, 6 Drawing Sheets

(51) Int. Cl.
  *G06N 3/04* (2006.01)
  *G06N 3/084* (2023.01)
(58) Field of Classification Search
  USPC .......................................................... 726/22
  See application file for complete search history.

(56) References Cited

U.S. PATENT DOCUMENTS

| | | | | |
|---|---|---|---|---|
| 2018/0115573 | A1* | 4/2018 | Kuo | H04L 63/101 |
| 2019/0104154 | A1* | 4/2019 | Kumar | G06N 20/00 |
| 2019/0394235 | A1* | 12/2019 | Pryce | G06K 9/6267 |
| 2020/0358819 | A1* | 11/2020 | Bowditch | G06K 9/6267 |

FOREIGN PATENT DOCUMENTS

| | | | |
|---|---|---|---|
| CN | 113344562 A | * | 9/2021 |
| CN | 114363019 A | * | 4/2022 |

OTHER PUBLICATIONS

Singh et al., "Phishing websites detection through supervised learning networks," 2015 International Conference on Computing and Communications Technologies (ICCCT), 2015, pp. 61-65, doi: 10.1109/ICCCT2.2015.7292720. (Year: 2015).*

Saha et al., "Phishing Attacks Detection using Deep Learning Approach," 2020 Third International Conference on Smart Systems and Inventive Technology (ICSSIT), 2020, pp. 1180-1185, doi: 10.1109/ICSSIT48917.2020.9214132. (Year: 2020).*

Wu et al., "A Phishing Detection System based on Machine Learning," 2019 International Conference on Intelligent Computing and its Emerging Applications (ICEA), 2019, pp. 28-32, doi: 10.1109/ICEA.2019.8858325. (Year: 2019).*

Megha et al., "An Intelligent System for Phishing Attack Detection and Prevention," 2019 International Conference on Communication and Electronics Systems (ICCES), 2019, pp. 1577-1582, doi: 10.1109/ICCES45898.2019.9002204. (Year: 2019).*

Anderson, et al., "Learning to Evade Static PE Machine Learning Malware Models via Reinforcement Learning", In Repository of arXiv:1801.08917v1, Jan. 26, 2018, 9 Pages.

Chatterjee, et al., "Deep Reinforcement Learning for Detecting Malicious Websites", In Repository of arXiv:1905.09207v1, May 22, 2019, 8 Pages.

Fang, et al., "Evading Anti-Malware Engines With Deep Reinforcement Learning", In Journal of IEEE Access, vol. 7, Mar. 28, 2019, pp. 48867-48879.

Li, et al., "An IRL-based Malware Adversarial Generation Method to Evade Anti-Malware Engines", In Journal of Computers & Security, vol. 104, May 1, 2021, 15 Pages.

Chatterjee, et al., "Detecting Phishing Websites through Deep Reinforcement Learning", In Proceedings of the IEEE 43rd Annual Computer Software and Applications Conference, vol. 2, Jul. 15, 2019, pp. 227-232.

Khalili, Mehdi, "Fiddler in Action—Part 2", Retrieved from: https://www.mehdi-khalili.com/fiddler-in-action/part-2, Aug. 26, 2011, 17 Pages.

Opara, et al., "HTMLPhish: Enabling Phishing Web Page Detection by Applying Deep Learning Techniques on HTML Analysis", In Proceedings of the International Joint Conference on Neural Networks, Jul. 19, 2020, 8 Pages.

"International Search Report and Written Opinion Issued in PCT Application No. PCT/US22/021723", dated Jul. 7, 2022, 17 Pages.

* cited by examiner

WEBPAGE PHISHING DETECTION USING DEEP REINFORCEMENT LEARNING

BACKGROUND

Phishing is a type of social engineering attack often used to steal user data, including login credentials, credit card numbers, or other potentially valuable data. Phishing occurs when an attacker, masquerading as a trusted entity, dupes a victim into providing information. In the context of a website, an attacker attempts to create a website that has a look and feel that matches that of a legitimate site. The attacker will typically spend time making the website seem as credible as possible, thus making the site hard to distinguish from the legitimate site. Whether a website is a phishing website or a real website is difficult to distinguish.

SUMMARY

Aspects of the disclosure improve upon prior phishing detection techniques by identifying a series of actions that, when applied to webpage content, cause the webpage content to evade phishing detection. The series of actions can be generalized such that it causes different phishing webpages to evade detection when altered in accord with the series of actions. Consider phishing website content that imitates a website of a first entity, such as a bank, credit card company, online merchant, or the like. A person can perform actions to alter the webpage content in an attempt to evade phishing detection. Those actions, when performed on phishing website content that imitate a second, different entity, can have a low probability of evading phishing detection. Using a reinforcement learning (RL) agent to learn the actions can increase a likelihood that the actions for evading phishing detection for one website, generalize to websites of other entities.

The RL agent, unlike gradient-based adversarial optimization, can handle discrete actions. The RL agent, unlike generative adversarial networks (GANs), does not require classifier gradients for operation. The RL agent is computationally faster than fuzzing techniques. The RL agent can handle sequential actions that are not suitable for Bayesian optimization or bandits.

A method can include identifying first webpage content comprising phishing content. A phishing detector, subject matter expert, or the like can tag webpage content as phishing or benign. The method can further include determining, using a reinforcement learning (RL) agent, at least one action. The action can alter the webpage content in a manner that does not alter the functionality of the webpage content. The method can include generating, based on the determined at least one action and the identified first webpage content, altered first webpage content. The action can be applied to the webpage content to alter the webpage content. The altered webpage content can be provided to the phishing detector for classification. The method can include identifying that the altered first webpage content is classified as benign. The action can be applied to other webpage content. The action is learned by the RL agent and more likely than other alterations to cause the phishing detector to change the classification of the content from phishing to benign. The method can include generating, based on the determined at least one action and second webpage content, altered second webpage content. The method can include training, based on the altered second webpage content and a corresponding label of phishing, a phishing detector. Training the phishing detector based on this content can help the phishing detector detect phishing in more instances, increasing overall accuracy of and security provided by the phishing detector.

Generating the altered first webpage content can include capturing web session traffic from accessing the generated altered webpage content and altering the captured web session traffic. Altering the web session traffic can includes (i) modifying a string of the web session traffic, (ii) augmenting the web session traffic, (iii) altering an image of the web session traffic; (iv) altering an encoding of a portion of the web session traffic, (v) a modification to source code of the web session traffic, or a combination thereof.

The method can further include translating a classification from the phishing detector to a reward for input to the RL agent. The reward can be used by the RL agent for further training and determining an action to be performed on webpage content that changes its classification from phishing to benign. The method can include generating features of the web session traffic for input as a state for the RL agent.

The method can include comparing the altered first webpage content and the first webpage content. The method can include determining that the altered first webpage content is confusable similar to the first webpage based on the comparison. Comparing the altered first webpage content and the first webpage content includes fuzzy matching. This check can help ensure that the changes made to the webpage content are realistic looking. A phishing webpage that is garbled is a phishing attempt that is generally not considered a threat.

The method can include identifying the altered second webpage content comprises phishing content. Sometimes an action, when performed on first webpage content, will make a phishing detector alter its classification of that content from phishing to benign. That same action, when performed on second webpage content may not cause the phishing detector to classify that content as benign. In such circumstances, the RL agent can try to learn what additional actions to perform on the second webpage content that cause the phishing detector to classify the content as benign. The method can include generating, based on one or more additional actions and the second webpage, further altered second webpage content. The method can include identifying the further altered second webpage content is benign. The at least one action and the one or more additional actions can be more likely to cause further webpage content to be classified as benign. The method can include applying the at least one action and the one or more additional actions to third webpage content. The method can include further training the phishing detector based on the further altered second webpage content and a label of phishing. A device, system, or computer-readable medium can be configured to perform the method.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Figure 1:
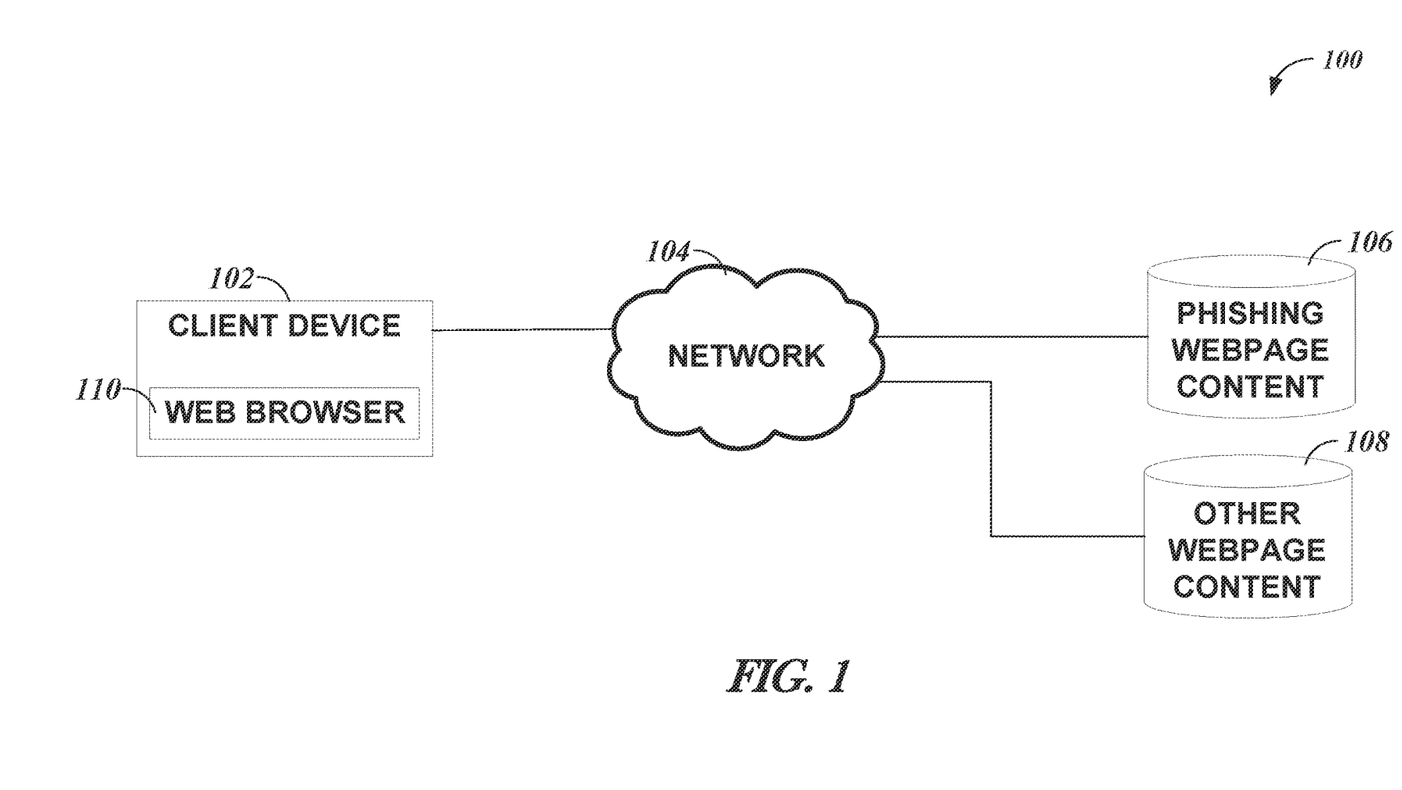
FIG. 1 illustrates, by way of example, a diagram of an embodiment of an internet system.

FIG. 1 illustrates, by way of example, a diagram of an embodiment of a networked system 100. The system 100 includes a client device 102 that accesses web content hosted on servers through a network 104. The web content can include normal or trusted, non-phishing webpage content 108 and phishing webpage content 106 designed to surreptitiously steal information from users of client device 102. The client device 102 can issue a request, through a web browser 110, for webpage content. The request can be issued to the network 104. The network 104 can receive the request and retrieve webpage content associated with the request. The webpage content is typically indicated by a uniform resource locator (URL).

A user of the client device 102 can access web content through the web browser 110. A typical web content access includes the user entering a human-readable website address or clicking on a link to website address. The web browser 110 issues a request for web content associated with the website address to the network 104. The network 104 determines where the web content is located, retrieves the web content, and provides the requested web content to the client device 102. The client device 102 then displays the web content on the web browser 110.

Unfortunately, not all web content is from good people doing valid business via trusted webpage content 108. A malicious entity can use web content to gain information from a user without the user knowing that they have provided the information to that entity. This information stealing is called phishing. The entity that gains the information will typically generate web content that imitates a legitimate website. The entity will then register the web content at a website address that is usually similar to the website address of the web content being imitated. For example, if a bank has the website address "htttps://bank.com" an imitating website address can be "http://bank.com". The web content accessed through the imitating address can be similar to the web content accessed through the legitimate website in look and feel.

Then, when a user navigates to the imitating website through the web browser 110 and enters personal information, the entity hosting the imitating website content receives the personal information provided by the user. This entity now has the personal information that can be used to access at least one account of the user (the user account on the legitimate website and maybe one or more other websites), credit card information, or other personal information. Often this information can be gathered and sold on the dark web.

Current systems that try to determine whether a website is phishing or not are detrimentally inaccurate. One example system is called Symantec Online Network for Advanced Response (SONAR). The SONAR, and other phishing detection systems, are only as good as the training data used to generate them and there is a lack of readily available, diverse data to train the system to catch a vast majority of phishing webpages.

Training a phishing webpage detector to better detect a phishing webpage can benefit from more or more varied examples. Aspects disclosed provide solutions for generating more training examples and providing actions to be performed on a webpage that generates other training examples. A training example in this context is one that the phishing detector determines is not phishing but is known to be phishing.

Figure 2:
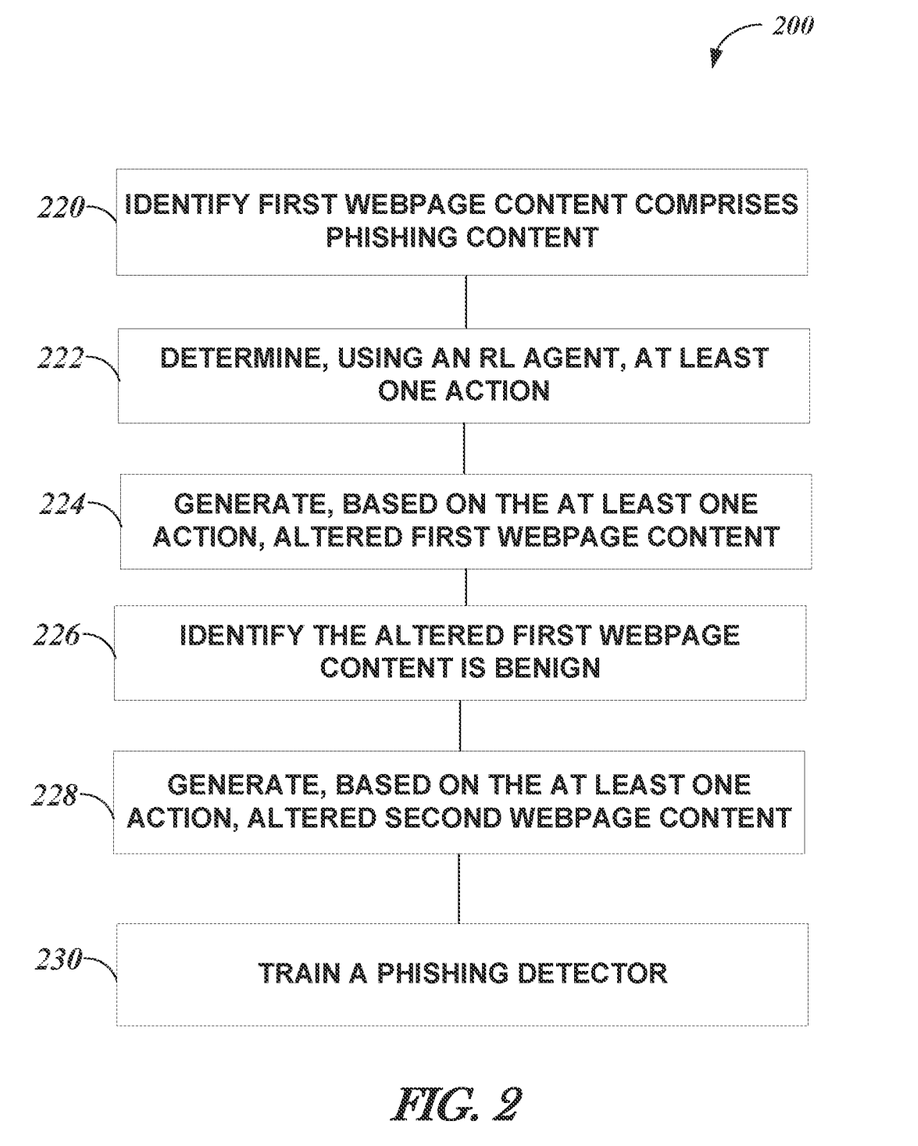
FIG. 2 illustrates, by way of example, a diagram of a method for improved phishing webpage detection.

FIG. 2 illustrates, by way of example, a diagram of a method 200 for improved phishing webpage detection. The method 200, as illustrated, includes identifying first webpage content comprising phishing content (e.g., determined to be phishing by a phishing detector), at operation 220; determining, using an RL agent, at least one action, at operation 222; generating altered first webpage content (e.g., by applying the at least one action to the first webpage content), at operation 224; identifying the altered first webpage content is benign (e.g., as determined by the phishing detector), at operation 226; generating, based on the at least one action, altered second webpage content (e.g., by applying the at least one action to second webpage content), at operation 228; and training a phishing detector, at operation 230. The operation 230 can be performed based on at least one of (i) the altered first webpage content and a corresponding label of phishing or (ii) the altered second webpage content and a corresponding label of phishing.

The identified first webpage content, from operation 220, can include webpage content determined to be phishing by a phishing detector. The identified first webpage content can include a webpage that asks the user for input, such as a username, password, credit card number, answer to a security question, or other identifying or personal information. There are many examples of such webpages. Some common examples include banks, credit cards, online retailers, health portals, among many others.

The reinforcement learning (RL) agent from operation 222 is described in more detail elsewhere. The RL can be trained to learn actions that, when applied to phishing webpage content, cause a phishing detector to indicate that the phishing webpage content is benign. The RL agent can be a deep RL (DRL) agent. The actions can be benign actions that do not affect the phishing nature of the webpage content. Examples of such actions include removing, replacing, or altering displayed text whether the text is human-readable or not, adding a comment to a document object model (DOM), adding a link, re-arranging elements as displayed on the webpage, blur, sharpen or reduce image quality, add noise to an image, replace image with a filtered version of the image, replace image with an "image missing" icon, among many others.

The RL agent can perform an action on phishing webpage content to generate altered phishing webpage content. The webpage content can be altered by directly altering the HTML or other representation of the webpage content or content referenced by the HTML. The altered phishing webpage content can be provided to a phishing detector for classification. The phishing detector can classify the altered phishing webpage content. The classification of the phishing webpage content can be used to determine a reward for the RL agent. The reward can be determined based on a heuristic discussed elsewhere. The RL agent can perform another action on the phishing webpage content. The newly generated webpage content can then be input into the phishing detector for classification. A reward can be determined for the RL agent for determining a next action to be performed on the webpage content.

The process of applying actions and testing classification can be repeated until (i) a specified number of actions (e.g., one, two, three, four, five, six, seven, eight, nine, ten, or more) have been performed and the phishing detector still classifies the phishing webpage content as phishing, (ii) the phishing detector classifies the phishing webpage content as benign (e.g., for a specified number of iterations of action application and classification), or (iii) the phishing webpage content is no longer recognized as a valid webpage. No longer recognizing the phishing webpage content as a valid webpage can include an inability to load the phishing webpage content on the web browser 110 (see FIG. 1) or the phishing webpage content, as modified by the actions, being determined to no longer look like the webpage content it is supposed to be imitating. Determining that the phishing webpage content, as modified by the RL agent, no longer looks like the webpage content can be determined using a human analyst, a fuzzy matching technique, a combination thereof, or the like.

The series of actions that, when applied to the phishing webpage content, cause the phishing detector to mischaracterize the phishing webpage content as benign can then be applied to other phishing webpage content, such as at operation 224. The learned series of actions, when applied to phishing webpage content, is more likely to generate phishing webpage content that is classified as benign than other approaches. An example of such a current approach is webpage content fuzzing. Webpage content fuzzing, however, is less likely to generate webpage content that is classified as benign by a phishing detector than the series of actions learned by the RL agent.

One or more of the altered first webpage content, altered second webpage content, or series of action can be useful for others attempting to thwart phishing webpages. The altered first webpage content or second webpage content can be used to help train a phishing detector. Such training can help the phishing detector better distinguish between phishing and benign webpage content. One or more of the altered first webpage content, altered second webpage content, or series of action can be useful for identifying a gap or weakness in a phishing detector. Training the phishing detector using the webpage content both before and after alteration in accord with the series of actions can help the phishing detector identify differences in webpage content that do not affect the phishing nature of the webpage content. Such training can help eliminate any gaps or flaws via the additional training.

Figure 3:
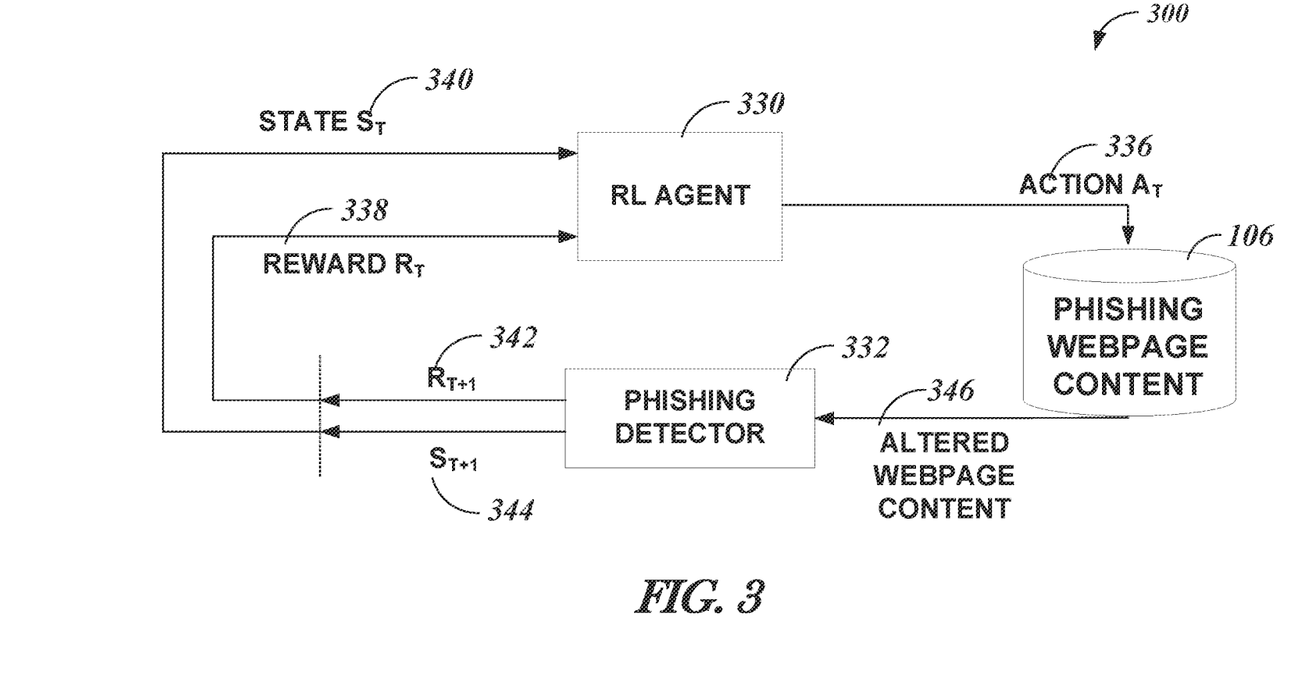
FIG. 3 illustrates, by way of example, a diagram of an RL agent phishing detector evasion system.

FIG. 3 illustrates, by way of example, a diagram of a RL agent phishing detector evasion system 300. The system 300 includes a RL agent 330, a phishing detector 332, and phishing webpage content 334. The RL agent 330 can receive state data 340 and a reward 338. The RL agent 330 can produce an action 336 to be performed on the phishing webpage content 334 based on the state data 340 and the reward 338. The state data 340 can include features extracted from the phishing webpage content 334 (e.g., after the action 336 is performed on the phishing webpage content 334). The reward data 338 can be a binary number, such as 1 or −1. The reward data 338 can equal one (1) if the phishing detector classifies the phishing webpage content 334 as benign after application of the action 336 and negative one (−1) if the phishing detector classifies the phishing webpage content 334 as phishing after application of the action 336. Note that 1 and −1 are merely example rewards and other reward values are possible.

DRL is an ML technique that combines reinforcement learning (RL) and a deep neural network (DNN). RL considers the problem of a computational agent learning making decisions by trial and error. DRL incorporates deep learning into the solution, allowing agents to make decisions from unstructured input data without manual engineering of the DNN state space.

RL is often modeled mathematically as a Markov Decision Process (MDP) in which an agent, at every timestep, t, is in a state s, takes action a, receives a scalar reward, r, and transitions to a next state $s_{t+1}$ according to environment dynamics. The agent attempts to learn a policy or map from observations (state) to actions, such as to maximize its returns (expected sum of rewards).

In many practical decision making problems, the states, s, of the MDP are high-dimensional (e.g., features of phishing webpage content) and cannot be solved by traditional RL techniques. DRL incorporates deep learning to solve such MDPs, often representing the policy or other learned functions as an NN.

The phishing detector 332 can include a black box ML model, a heuristic model, a combination thereof, or the like. The phishing detector 332 can determine, given webpage content as an input, whether the webpage content employs a phishing scheme. The phishing detector 332 can provide a classification of the webpage content that indicates whether the webpage content is benign or phishing.

The phishing webpage content 334 can be organized and altered in a number of ways. One way is to store the phishing webpage content in a Session Archive Zip (SAZ) format. In SAZ format, hypertext transport protocol secure (HTTPS) request, corresponding response, and associated data and metadata are stored. The SAZ data can then be constructed into a web session using an application (and in a controlled environment such as a sandbox). The SAZ data can be altered and detonated for classification. If the altered web session data results in a classification of benign, the action(s) performed on the webpage content and the altered webpage content can be stored. By storing data in the SAZ format, hypertext pre-preprocessor (PHP), hypertext markup language (HTML), cascading style sheets (CSS), or other HTTPS traffic can be modified. Note that while SAZ is discussed and might have benefits over other storage formats, SAZ is not required and other storage formats can be used.

Figure 4:
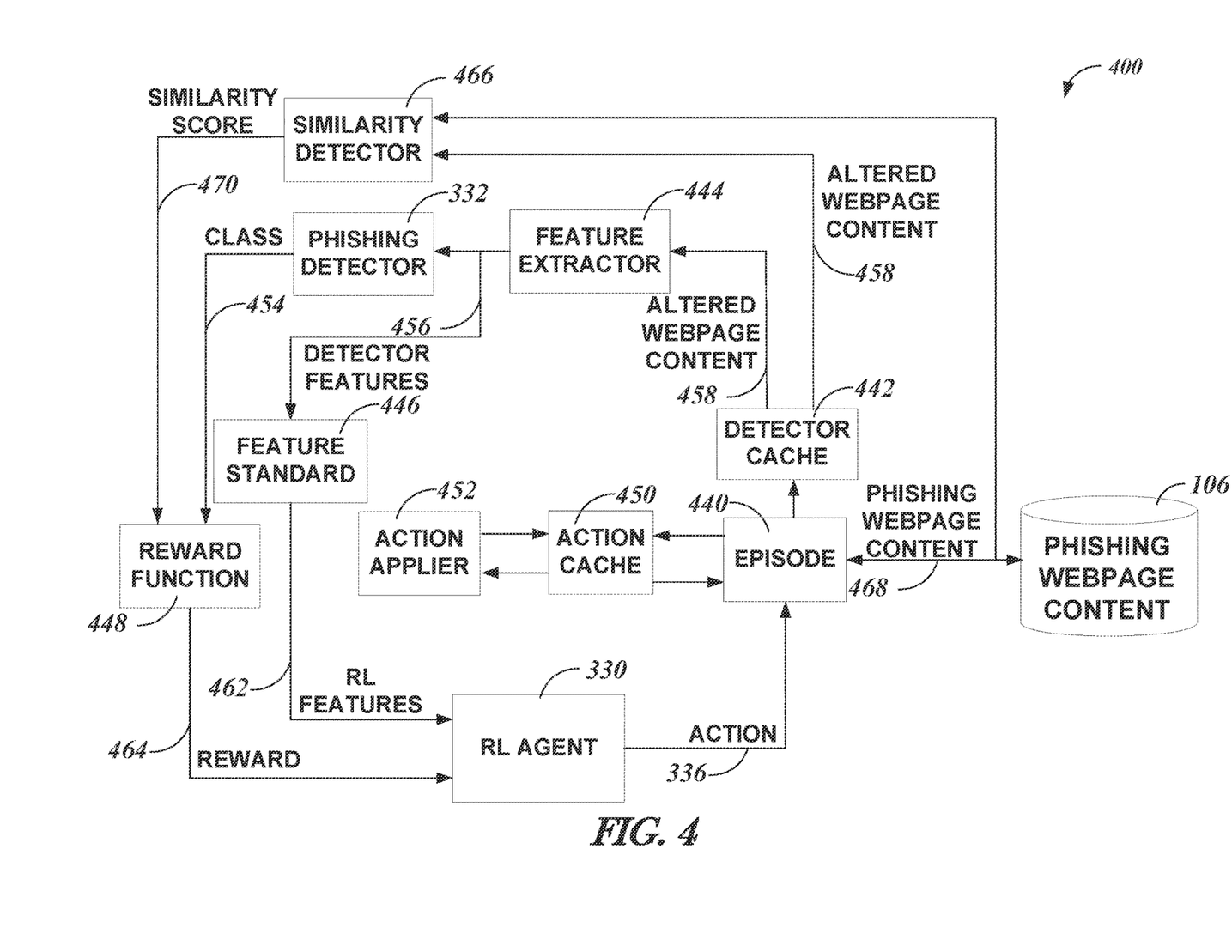
FIG. 4 illustrates, by way of example, a more detailed diagram of a system 400 for phishing detection evasion.

FIG. 4 illustrates, by way of example, a more detailed diagram of a system 400 for phishing detection evasion. The system 400 as illustrated includes the phishing detector 332 and RL agent 330 from FIG. 3 and the phishing webpage content 106 from FIG. 1. The system also includes the following components: an episode operator 440, a detector cache 442, feature extractor 444, feature standardization operator 446, a reward function operator 448, an action cache 450, and an action applier operator 452. Not all components are need in all instances of operation and some components can be left out of some instances.

The episode 440 detonates an instance of the phishing webpage content 106 after an action is applied to the phishing webpage content by the action applier operator 452 and stored in the action cache 450. The episode 440 monitors the web traffic generated based on the detonated instance of the phishing webpage content 106. The episode 440 records the web traffic in a detector cache 442. The monitored web traffic can include HTTP traffic between a sandbox in which the episode 440 is executed and the internet (e.g., the network 104 see FIG. 1). An example of a monitor that captures web traffic and stores it in SAZ format is Fiddler, a program developed by Eric Lawrence. Other web traffic monitors are available.

The detector cache 442 can store web traffic captured by the episode 440. of phishing web content detonation. The detector cache 442 can provide the webpage content of the web traffic to the feature extractor 444.

The feature extractor 444 can determine features 456 of altered webpage content 458 to be used by the phishing detector 332 in determining a classification 454. Feature extraction is a process of dimensionality reduction by which an initial set of raw data is reduced to more manageable dimensions for processing. Feature extraction is a name for methods that select and possibly combine variables into features, effectively reducing an amount of data that is to be processed while still accurately and describing the original data set. Example feature extractors include autoencoders, independent component analysis, Isomap, kernel principal component analysis (PCA), latent semantic analysis, partial least squares, PCA, multi-factor dimensionality reduction, nonlinear dimensionality reduction, multilinear PCA, multilinear subspace learning, semidefinite embedding, bag-of-words, image processing to detect shapes, edges, motion, a combination thereof, or the like.

The phishing detector 332 can receive the detector features 456. The phishing detector 332 can generate the classification 454 based on the features 456. The classification 454 can indicate whether altered webpage content 458 is phishing or benign. The altered webpage content 458 is phishing webpage content 106 that has been altered in accord with an action 336. Examples of the phishing detector 332 include SONAR, black box phishing detection models, or the like. There are many phishing detection techniques that exist and the phishing detector 332 can include an existing phishing detector or a future phishing detector.

A feature standardization operator 446 can alter the detector features 456 to be compatible with the RL agent 330. RL features 462 are compatible and operable by the RL agent 330. The RL features 462 make up the state that is used, at least in part, by the RL agent 330 to determine the action 336.

A reward function 448 can receive the classification 454. The reward function 448 can convert the classification to a reward 464. The reward, in some examples, can include a first specified value if the classification is benign and a second, different specified value if the classification is phishing.

The RL agent 330, as previously discussed, can determine the action 336 to be performed based on the state (e.g., the RL features 462) and the reward 464. The RL agent 330 can include a neural network (NN) configured to supplement the operations of a Markov Decision Process (MDP). The RL agent 330 can be trained by replaying memories (e.g., a subset, such as a random subset of memories) that include past states and rewards with resultant actions modified to increase the reward.

The action 336 can include any action discussed herein. Example actions include (i) an image modification, such as adding noise, changing aspect ratio, inverting image color or orientation, or the like, (ii) a text modification, such as adding text, substituting text, removing text, altering the text format (e.g., replacing American Standard Code for Information Interchange (ASCII) with Unicode or the like), or the like, (iii) a source code modification, such as to the HTML representation of the webpage content, adding a comment to a CSS file, obfuscating source code, changing source code styling, or the like, or (iv) other action not discussed that does not materially alter the phishing nature or other functionality of the webpage content.

The RL agent 330 is configured to implement a learned policy that identifies sequences of actions that succeed in evading detection by the phishing detector 332. The learned series of actions or RL agent 330 can then be leveraged for one or more of a variety of applications. The application can include using the web session content corresponding to phishing webpage content that evaded detection to train the phishing detector 332 or another phishing detector. The web session content can help add examples for webpages that do not have sufficient phishing examples to train the phishing detector 332 to better predict phishing. The web session content can help add examples for training to make the phishing detector 332 more robust. The application can include identifying sequences of actions to which the phishing detector 332 is most vulnerable to and fixing those vulnerabilities through further training or adjusting heuristic rules of phishing detection.

The action cache 450 can store a series of next actions to be applied to the phishing webpage content 106. The action applier 452 can implement the action on the phishing webpage content 106. The action applier 452 can alter the web session content captured by the episode 440 in accord with the action 336 from the action cache 450. Making the modification can include altering the web session content such that the episode 440 is changed in a way that does not alter the phishing nature of the web session. Making the modification can alter the web session content in a manner that does not materially change the appearance of the webpage or webpages of the web session. A material change is a change that causes the altered webpage to not be confusably similar to the original webpage. A person or fuzzy matching technique, or a combination thereof, can compare the visual similarity of the original webpage content and the altered webpage content. If the person or the fuzzy matching technique determine the webpage content is no longer confusably similar, the series of actions can be discarded. This is because the phishing nature of the webpage content relies on the webpage content being confusably similar. The fuzzy matching technique can be implemented by the phishing detector 332 or another component of a system.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

AI is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN-here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for backpropagation may be used, such as stochastic gradient descent (SGD), Adam, etc.

Figure 5:
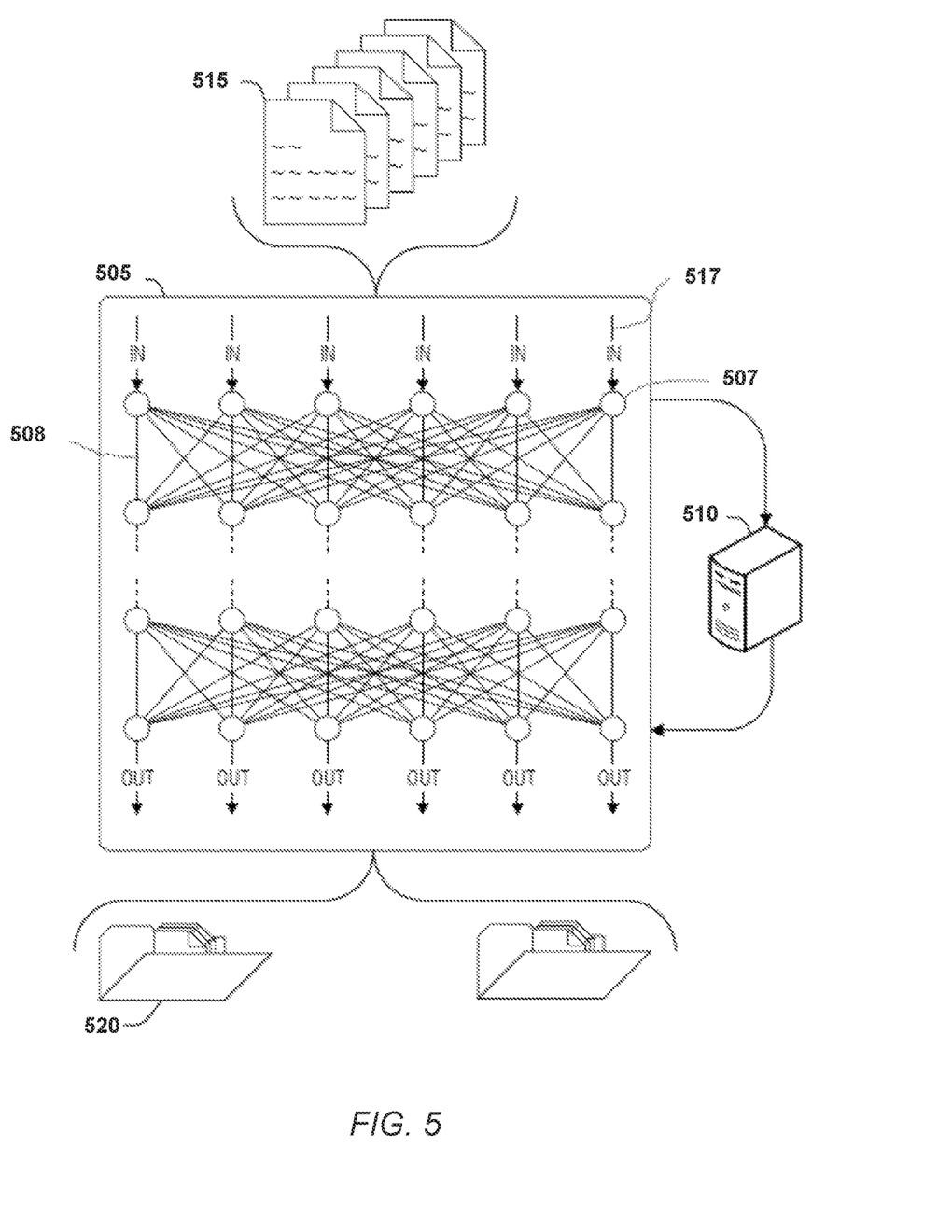
FIG. 5 is a block diagram of an example of an environment including a system for neural network training, according to an embodiment.

FIG. 5 is a block diagram of an example of an environment including a system for neural network training, according to an embodiment. The system includes an artificial NN (ANN) 505 that is trained using a processing node 510. The processing node 510 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 505, or even different nodes 507 within layers. Thus, a set of processing nodes 510 is arranged to perform the training of the ANN 505.

The set of processing nodes 510 is arranged to receive a training set 515 for the ANN 505. The ANN 505 comprises a set of nodes 507 arranged in layers (illustrated as rows of nodes 507) and a set of inter-node weights 508 (e.g., parameters) between nodes in the set of nodes. In an example, the training set 515 is a subset of a complete training set. Here, the subset may enable processing nodes with limited storage resources to participate in training the ANN 505.

The training data may include multiple numerical values representative of a domain, such as a word, symbol, other part of speech, or the like. Each value of the training or input 517 to be classified once ANN 505 is trained, is provided to a corresponding node 507 in the first layer or input layer of ANN 505. The values propagate through the layers and are changed by the objective function.

As noted above, the set of processing nodes is arranged to train the neural network to create a trained neural network. Once trained, data input into the ANN will produce valid classifications 520 (e.g., the input data 517 will be assigned into categories), for example. The training performed by the set of processing nodes 507 is iterative. In an example, each iteration of the training the neural network is performed independently between layers of the ANN 505. Thus, two distinct layers may be processed in parallel by different members of the set of processing nodes. In an example, different layers of the ANN 505 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 507 (e.g., neurons) are trained independently. In an example, the nodes are trained on different hardware.

Figure 6:
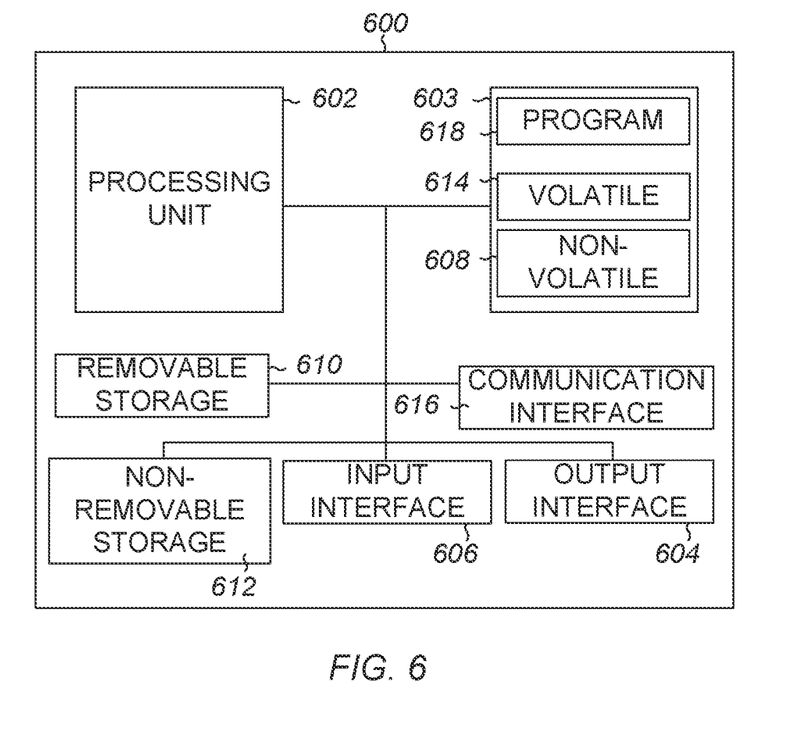
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. The machine 600 can implement a technique for image normalization using an autoencoder. The client device 102, network 104, RL agent 330, phishing detector 332, feature extractor 444, feature standardization operator 446, reward function 448, episode operator 440, action applier 452, or a component thereof can include one or more of the components of the machine 700. One or more of the client device 102, network 104, RL agent 330, phishing detector 332, feature extractor 444, feature standardization operator 446, reward function 448, episode operator 440, action applier 452, operation of the method 200, or a component thereof can be implemented, at least in part, using a component of the machine 600. One example machine 600 (in the form of a computer), may include a processing unit 602, memory 603, removable storage 610, and non-removable storage 612. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include— or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 602 (sometimes called processing circuitry) of the machine 600. A hard drive, CD-ROM, and RAM are some examples of articles including a non-transitory computer-readable medium such as a storage device. For example, a computer program 618 may be used to cause processing unit 602 to perform one or more methods or algorithms described herein.

Additional Notes and Examples

Example 1 can include a system comprising processing circuitry and a memory including instructions that, when executed by the processing circuitry, cause the processing circuitry to perform operations for phishing webpage content detection, the operations comprising identifying first webpage content comprising phishing content, determining, using a reinforcement learning (RL) agent, at least one action, generating, based on the determined at least one action and the identified first webpage content, altered first webpage content, identifying that the altered first webpage content is benign, generating, based on the determined at least one action and second webpage content, altered second webpage content, and training, based on the altered second webpage content and a corresponding label of phishing, a phishing detector.

In Example 2, Example 1 can further include, wherein generating the altered first webpage content includes capturing web session traffic from accessing the generated altered webpage content and altering the captured web session traffic.

In Example 3, Example 2 can further include, wherein altering the web session traffic includes one or more of (i) modifying a string of the web session traffic, (ii) augmenting the web session traffic, (iii) altering an image of the web session traffic; (iv) altering an encoding of a portion of the web session traffic; or (v) a modification to source code of the web session traffic.

In Example 4, at least one of Examples 2-3 can further include, wherein the operations further comprise translating a classification from the phishing detector to a reward for input to the RL agent.

In Example 5, Example 4 can further include, wherein the operations further comprise generating features of the web session traffic for input as a state for the RL agent.

In Example 6, at least one of Examples 2-5 can further include, wherein the operations further comprise comparing the altered first webpage content and the first webpage content and determining that the altered first webpage content is confusedly similar to the first webpage based on the comparison.

In Example 7, Example 6 can further include, wherein comparing the altered first webpage content and the first webpage content includes fuzzy matching.

In Example 8, at least one of Examples 1-7 can further include, wherein the operations further comprise identifying the altered second webpage content comprises phishing content, generating, based on one or more additional actions and the second webpage, further altered second webpage content, identifying the further altered second webpage content is benign, and applying the at least one action and the one or more additional actions to third webpage content.

Example 9 includes a method of performing the operations of at least one of Examples 1-8.

Example 10 includes a (non-transitory) machine-readable medium including instructions that, when executed by a machine, cause the machine to perform the operations of at least one of Examples 1-8.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:
1. A system comprising:
  processing circuitry;

a memory including instructions that, when executed by the processing circuitry, cause the processing circuitry to perform operations for phishing webpage content detection, the operations comprising:
- identifying first webpage content comprises phishing content;
- determining, using a reinforcement learning (RL) agent, at least one action to evade phishing detection;
- generating altered first webpage content based on (i) the determined at least one action, (ii) the identified first webpage content, and (iii) web session traffic that is altered from accessing the first webpage content;
- identifying the altered first webpage content is benign;
- generating, based on the determined at least one action and second webpage content, altered second webpage content; and
- training, based on the altered second webpage content and a corresponding label of phishing, a phishing detector.

2. The system of claim 1, wherein generating the altered first webpage content includes capturing web session traffic from accessing the generated altered webpage content and altering the captured web session traffic.

3. The system of claim 2, wherein altering the web session traffic includes one or more of (i) modifying a string of the web session traffic, (ii) augmenting the web session traffic, (iii) altering an image of the web session traffic; (iv) altering an encoding of a portion of the web session traffic; or (v) a modification to source code of the web session traffic.

4. The system of claim 2, wherein the operations further comprise translating a classification from the phishing detector to a reward for input to the RL agent.

5. The system of claim 4, wherein the operations further comprise generating features of the web session traffic for input as a state for the RL agent.

6. The system of claim 2, wherein the operations further comprise:
- comparing the altered first webpage content and the first webpage content; and
- determining that the altered first webpage content is confusably similar to the first webpage based on the comparison.

7. The system of claim 6, wherein comparing the altered first webpage content and the first webpage content includes fuzzy matching.

8. The system of claim 1, wherein the operations further comprise:
- identifying the altered second webpage content comprises phishing content;
- generating, based on one or more additional actions and the second webpage, further altered second webpage content;
- identifying the further altered second webpage content is benign; and
- applying the at least one action and the one or more additional actions to third webpage content.

9. A method comprising:
- identifying first webpage content comprises phishing content;
- determining, using a reinforcement learning (RL) agent, at least one action to evade phishing detection;
- generating altered first webpage content based on (i) the determined at least one action, (ii) the identified first webpage content, and (iii) web session traffic that is altered from accessing the first webpage content;
- identifying that the altered first webpage content is benign;
- generating, based on the determined at least one action and second webpage content, altered second webpage content; and
- training, based on the altered second webpage content and a corresponding label of phishing, a phishing detector.

10. The method of claim 9, wherein generating the altered first webpage content includes capturing web session traffic from accessing the generated altered webpage content and altering the captured web session traffic.

11. The method of claim 10, wherein altering the web session traffic includes one or more of (i) modifying a string of the web session traffic, (ii) augmenting the web session traffic, (iii) altering an image of the web session traffic; (iv) altering an encoding of a portion of the web session traffic; or (v) a modification to source code of the web session traffic.

12. The method of claim 10, further comprising translating a classification from the phishing detector to a reward for input to the RL agent.

13. The method of claim 12, further comprising generating features of the web session traffic for input as a state for the RL agent.

14. The method of claim 10, further comprising:
- comparing the altered first webpage content and the first webpage content; and
- determining that the altered first webpage content is confusedly similar to the first webpage based on the comparison.

15. The method of claim 14, wherein comparing the altered first webpage content and the first webpage content includes fuzzy matching.

16. The method of claim 9, further comprising:
- identifying the altered second webpage content comprises phishing content;
- generating, based on one or more additional actions and the second webpage, further altered second webpage content;
- identifying the further altered second webpage content is benign; and
- applying the at least one action and the one or more additional actions to third webpage content.

17. A non-transitory machine-readable medium including instructions that, when executed by a machine, cause the machine to perform operations comprising:
- identifying first webpage content comprising phishing content;
- determining, using a reinforcement learning (RL) agent, at least one action to evade phishing detection;
- generating altered first webpage content based on (i) the determined at least one action, (ii) the identified first webpage content, and (iii) web session traffic that is altered from accessing the first webpage content;
- identifying that the altered first webpage content is benign;
- generating, based on the determined at least one action and second webpage content, altered second webpage content; and
- training, based on the altered second webpage content and a corresponding label of phishing, a phishing detector.

18. The non-transitory machine-readable medium of claim 17, wherein generating the altered first webpage content includes capturing web session traffic from accessing the generated altered webpage content and altering the captured web session traffic.

19. The non-transitory machine-readable medium of claim 18, wherein altering the web session traffic includes one or more of (i) modifying a string of the web session traffic, (ii) augmenting the web session traffic, (iii) altering an image of the web session traffic; (iv) altering an encoding of a portion of the web session traffic; or (v) a modification to source code of the web session traffic.

20. The non-transitory machine-readable medium of claim 18, wherein the operations further translating a classification from the phishing detector to a reward for input to the RL agent.

* * * * *